United States Patent
Hinkley

(10) Patent No.: US 8,820,359 B2
(45) Date of Patent: Sep. 2, 2014

(54) SEAMLESS FLUID STORAGE AND TRANSPORT MODULE

(75) Inventor: David A. Hinkley, La Mirada, CA (US)

(73) Assignee: The Aerospace Corporation, El Segundo, CA (US)

( * ) Notice: Subject to any disclaimer, the term of this patent is extended or adjusted under 35 U.S.C. 154(b) by 1072 days.

(21) Appl. No.: 12/288,530

(22) Filed: Oct. 21, 2008

(65) Prior Publication Data

US 2010/0096030 A1   Apr. 22, 2010

(51) Int. Cl.
*B29C 35/08* (2006.01)
*F17C 1/00* (2006.01)
*B64G 1/40* (2006.01)

(52) U.S. Cl.
CPC ......... *B64G 1/402* (2013.01); *F17C 2270/0194* (2013.01); *F17C 2250/0465* (2013.01); *F17C 2227/03* (2013.01); *F17C 2260/013* (2013.01); *F17C 2260/01* (2013.01); *F17C 1/00* (2013.01); *F17C 2260/036* (2013.01); *F17C 2203/066* (2013.01); *F17C 2205/0323* (2013.01); *F17C 2227/0388* (2013.01); *F17C 2250/0447* (2013.01); *F17C 2203/0636* (2013.01); *F17C 2250/043* (2013.01); *F17C 2205/0341* (2013.01); *F17C 2209/21* (2013.01)
USPC ................... 137/884; 244/172.3; 264/272.11; 264/401

(58) Field of Classification Search
USPC ............ 137/884; 244/172.3; 264/272.11, 401
See application file for complete search history.

(56) References Cited

U.S. PATENT DOCUMENTS

| 3,811,474 | A  | * | 5/1974  | Bauer et al. ................ 137/833 |
| 4,961,154 | A  | * | 10/1990 | Pomerantz et al. ........... 345/419 |
| 4,999,143 | A  | * | 3/1991  | Hull et al. ................... 264/401 |
| 5,705,117 | A  | * | 1/1998  | O'Connor et al. ........... 264/401 |
| 6,562,278 | B1 | * | 5/2003  | Farnworth et al. ........... 264/401 |
| 6,821,666 | B2 | * | 11/2004 | Morse et al. ................. 429/535 |
| 7,132,650 | B1 | * | 11/2006 | Gamble et al. ............... 250/288 |
| 7,217,367 | B2 | * | 5/2007  | Huang et al. ................. 210/656 |
| 7,445,027 | B2 | * | 11/2008 | Flachsbart et al. ........... 137/803 |
| 7,485,500 | B2 | * | 2/2009  | Wegerer et al. .............. 438/125 |
| 7,502,023 | B2 | * | 3/2009  | Zinniel et al. ................ 345/419 |
| 8,067,078 | B1 | * | 11/2011 | Espinosa et al. .............. 428/57 |
| 2005/0199298 | A1 | * | 9/2005 | Farrington ............. 137/625.37 |
| 2006/0005729 | A1 | * | 1/2006 | Milton et al. ................. 102/202 |

* cited by examiner

*Primary Examiner* — John Fox
(74) *Attorney, Agent, or Firm* — Sutherland Asbill & Brennan LLP

(57) ABSTRACT

A fluid storage and transport module includes complex plumbing features such as fluid reservoirs, filters, heat exchangers, three-dimensionally routed tubing, valves, mixing chambers, and exit apertures formed in and on a monolithic common bulk material using an additive rapid prototyping process of depositing multiple layers of rapid prototyping materials without welds, adhesives or compression fittings, being made by a method that minimizes leaks, maximizes packing density of the functional components, and increases the plumbing robustness to leaks.

20 Claims, 2 Drawing Sheets

PARTIALLY COMPLETED MONOLITHIC BULK MATERIAL DEVICE

SEAMLESS FLUID STORAGE AND TRANSPORT MODULE

STATEMENT OF GOVERNMENT INTEREST

The invention was made with Government support under contract number FA8802-04-C-0001 awarded by the Department of the Air Force. The Government has certain rights in the invention.

SPECIFICATION

FIELD OF THE INVENTION

The invention relates to the field of fluid storage and transportation modules including spacecraft manufacturing. More particularly, the present invention relates to additive rapid prototyping methods of making small spacecraft having stored fluids.

BACKGROUND OF THE INVENTION

The paramount goal of a fluid management system is that it not leak. Leaky fluid management systems disadvantageously require repairs or fluid replenishment. A secondary goal is that the fluid management system be as small as possible. A third goal is that fabrication costs are low. A fourth goal is that the production time is short. An ideal fluid management system is leakless, small, inexpensive, and rapidly made.

Small spacecraft use propulsion systems that utilize stored fluids. A small propulsion system is a form of a fluid management system that is useful for miniature satellites. Propulsion for miniature spacecraft, such as picosatellites and nanosatellites, requires a fluid management system that is preferably leakless, small, inexpensive, and rapidly made. For an example of a small spacecraft see "The Design and Test of a Compact Propulsion System for CanX Nanosatellite Formation Flying," Stephen Mauthe, et al., 19th Annual Conference on Small Satellite, Logan Utah, 2005. Propulsion units are typically constructed by assembling distinct functional components such as tanks, valves, and tubing with fittings, generally designated as internal plumbing. For reliability, it is desirable to minimize the number of fittings because each fitting is a potential leak location. Also, each fitting requires a means for sealing. Miniature satellites often do not provide adequate room for wrenching the fitting nuts tight, thereby presenting an assembly challenge that is often solved by spacing parts far apart. When the parts are spaced far apart, then space is wasted inside the miniature spacecraft making it not so miniature. When the parts joined by fittings happen to be of different materials, then a coefficient of expansion mismatch may also cause leakage. When the joints between components are sealed by welding or bonding rather than wrenching, then the assembly still must be designed with some consideration for adequate access to the joints, which typically results in a less then optimal packaging efficiency. When tubing must be bent to follow a permissible path from a tank to a valve or thruster nozzle, then the tube must be bent accurately and precisely, which is a difficult, time consuming, and therefore costly task.

A prior art solution to the problem of sealing tubing joints and bending tubes precisely is a laminate structure whereby channels create a manifold to move fluids from one place to another are etched into layers of metal or plastic. U.S. Pat. No. 6,334,301, issued to Otsap on Jan. 1, 2002, entitled "Assembly of Etched Sheets Forming a Fluidic Module" teaches layering to form a fluidic module using chemical etching. U.S. Pat. No. 6,645,432, issued to Anderson on Nov. 11, 2003, entitled "Microfluidic Systems Including Three-Dimensionally Arrayed Channel Networks" teaches making sealed channels using molded layers. The layers are diffusion bonded or glued to one another with the benefit of a much larger surface area for the bond and therefore less likelihood of leaking. Each layer of the manifold is etched or machined and must be successfully bonded to its neighboring layers. This assembly method is methodical and expensive with no guarantee that the bonding will be successful and leak free. The use of bonded layers creates an opportunity for leaks in between the bonded layers. The thickness of the layers will also determine the smoothness of any curved surface of three-dimensional paths, such as channels and tubes that extend between layers. Multiple layers that are bonded together do not always provide for desirable smooth surfaces, with several layers forming jagged curved surfaces. A prior solution for making microfluidic three-dimensional systems used bonded layers to adhere layers together to form internal three-dimensional fluid paths. The layers were etched or molded and then joined together. The assembly method for fabricating a complete module disadvantageously requires fabricating each layer separately and bonding each in turn to form the module.

A prior art method for creating structures and fluid transport elements in a monolithic structure is by using concentrated UV light to expose photosensitive glass. U.S. Pat. No. 5,374,291, issued to Yabe on Dec. 20, 1994 entitled "Method of processing Photosensitive Glass" teaches photoetching of glass. U.S. Pat. No. 6,783,920, issued to Livingston, entitled "Photosensitive Glass Variable Laser Exposure Patterning Method", teaches making sealed channels in ceramic photosensitive materials. The process begins with a solid block of glass that has the correct properties in order to respond to the laser developing. A laser spot can be positioned in three dimensions by a computer controlled program that is used to write the desired internal patterns, thereby developing channels within the block. The developed areas are then removed by chemically etching. In this method, when a large volume must be removed, then the process is disadvantageously a time consuming process.

Computer aided design software has been used to rapidly make solid mechanical models and prototypes. Computer controlled rapid additive prototyping machines and materials have made three-dimensional fluidic modules. The computer aided design software can run on personal computers providing the capability to create a part that is impossible to make when only traditional subtractive machining is used. When using rapid prototyping by an additive production method, a three-dimensional part or module can be made quickly. Historically, additive rapid prototyping was used to fit check parts that would later be produced as production parts by injection molding or even subtractively machined. Historically, the quality of the prototyping part was dimensionally imprecise and the material was grainy and brittle, generally unsuitable for long term fluidic plumbing use.

However, in recent years, new rapid prototyping machines, processes and materials have been used. The speed and accuracy of the rapid prototyping models are improving. The quality and ease of using the computer software has also improved as well. It has now become easy to create complex three-dimensional rapid prototyping models and objects. The rapid prototyping by designers is carefully done so that the prototype design can be manufactured by final manufacturing processes, which are different than the rapid prototyping processes. Most notably, the cost of the prototyping machines has been reduced and the quality and variety of the prototyping materials has increased.

One type of rapid prototyping is the additive rapid prototyping process that typically uses a powder or liquid resin that is laid down and cured. Powder metals have also been used in rapid prototyping processes for creating metal models. In the additive rapid prototyping process, a computer model of the three-dimensional prototype part is computationally sliced up into layers of equal thickness, typically a few thousandths of an inch thick. The layers are digitally patterned, without the use of masks to lay down layers in sequence. The prototype part is thus additively built by separately laying down each of many thin layers on top of a prior layer and curing the material so that the layers adhere together in a permanent manner. In this way, the layers are patterned and laid down in sequence. The prototyping parts created by additive rapid prototyping are used for prototyping an object that might end up as an injected molded production part upon the final manufacturing production runs. The rapid prototyping allows engineers to inspect and examine the prototype part prior to the relatively expensive step of creating a mold to make final manufactured production parts. A few instances have emerged where rapid prototyping parts are used directly as a finished product. However, some prototyping materials are brittle and unsuitable for use in fluidic systems.

Prior art fluidic modules having small dimensions are difficult to produce. Prior art methods of bonding together successive layers to form a three-dimensional part suffer from unwanted gaps and voids that may be unsuitable for use in fluidic systems. Laser exposed photoceramic glasses require extensive evacuation steps restricted to expensive photostructurable materials. Additive rapid prototyping have used brittle and grainy materials that are unsuitable for use in fluidic systems. These and other disadvantages are solved or reduced using the invention.

SUMMARY OF THE INVENTION

An object of the invention is to provide a seamless manifold housing made by additive rapid prototyping processes, having seamless and jointless interfaces.

Another object of the invention is to provide a seamless manifold housing made by additive rapid prototyping processes, such as stereolithography, having seamless and jointless interfaces, for containing liquid or pressurized gas, which is well suited for use in miniature small satellites.

Yet another object of the invention is to provide a monolithic structure made from layered rapid prototyping material.

Still another object of the invention is to provide a monolithic structure made from a layered rapid prototyping material and having internal plumbing elements.

A further object of the invention is to provide a monolithic liquid transporting structure made from a layered rapid prototyping material, which includes internal plumbing elements.

The invention is directed to a fluid storage and transport module that includes a combination of plumbing elements that can be joined together in a seamless manner from a common rapid prototyping material to form a monolithic structure that both mechanically supports the plumbing elements and also seals the plumbing elements together in a leak free manner and with the added benefit of optimal space efficiency. The invention can be applied to create a pressurized fluid management system that can be made using additive rapid prototyping processes. The inventor has discovered that some rapid prototyping materials are suitable for containing fluids in a seamless manner. The inventor has also discovered that small aperture tubing can be created within these materials with precision and without leaks. The inventor has discovered that surface finishes of certain rapid prototyping materials are smooth and well suited for sealing with gaskets. The inventor has also discovered that certain rapid prototyping materials can be conditioned to meet a low outgassing requirement for spaceflight use. The inventor has also discovered that additive rapid prototyping processes can lay down successive material layers without creating any gaps or voids that would otherwise weaken the structure or leak fluid. In the preferred form of the invention, the fluid management system is well suited for miniature spacecraft. Seamless manifolds that are created using the additive rapid prototyping process and materials, can be used under pressure for extended periods of time without leaks.

The method of making the module alleviates the need for bonding layers to realize three-dimensional internal paths and also improves the smoothness of surfaces that cross between layers for producing a useable part quickly. Additive rapid prototyping parts are sufficiently dimensionally precise, seamless, and leak free, and are well suited for making manifolds that can be manufactured and used in a fluidic application. The present invention is a fluid storage and transport module consisting of complex plumbing features such as fluid reservoirs, filters, heat exchangers, three-dimensionally routed tubing, mixing chambers or exit apertures, all of which are formed inside and about the external surface of a monolithic bulk material, such that, these features are integrated without welds, adhesives or compression fittings. This method minimizes the opportunity for leaks, maximizes packing density of the plumbing elements, and increases the plumbing robustness to leaks by structurally joining the internal features together. These and other advantages will become more apparent from the following detailed description of the preferred embodiment.

DETAILED DESCRIPTION OF THE PREFERRED EMBODIMENT

Figure 1:
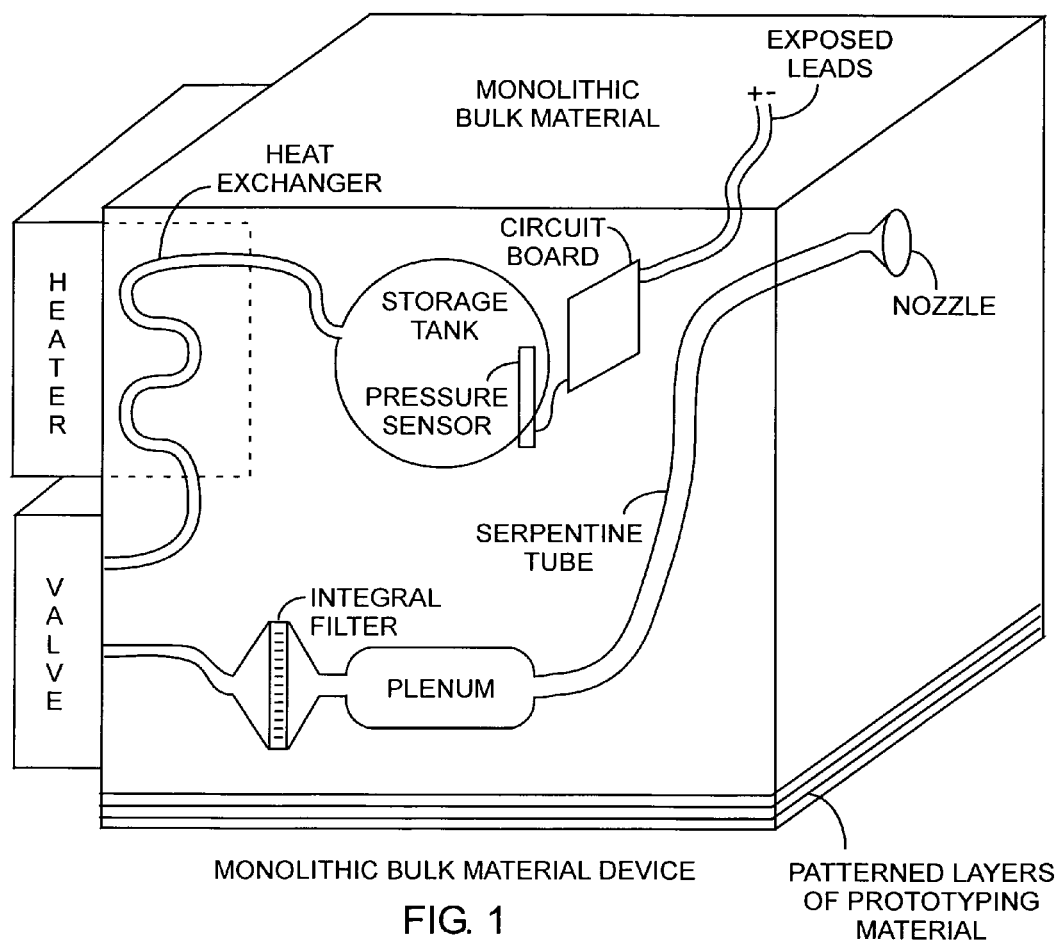
FIG. 1 depicts a monolithic bulk material device.
Figure 2:
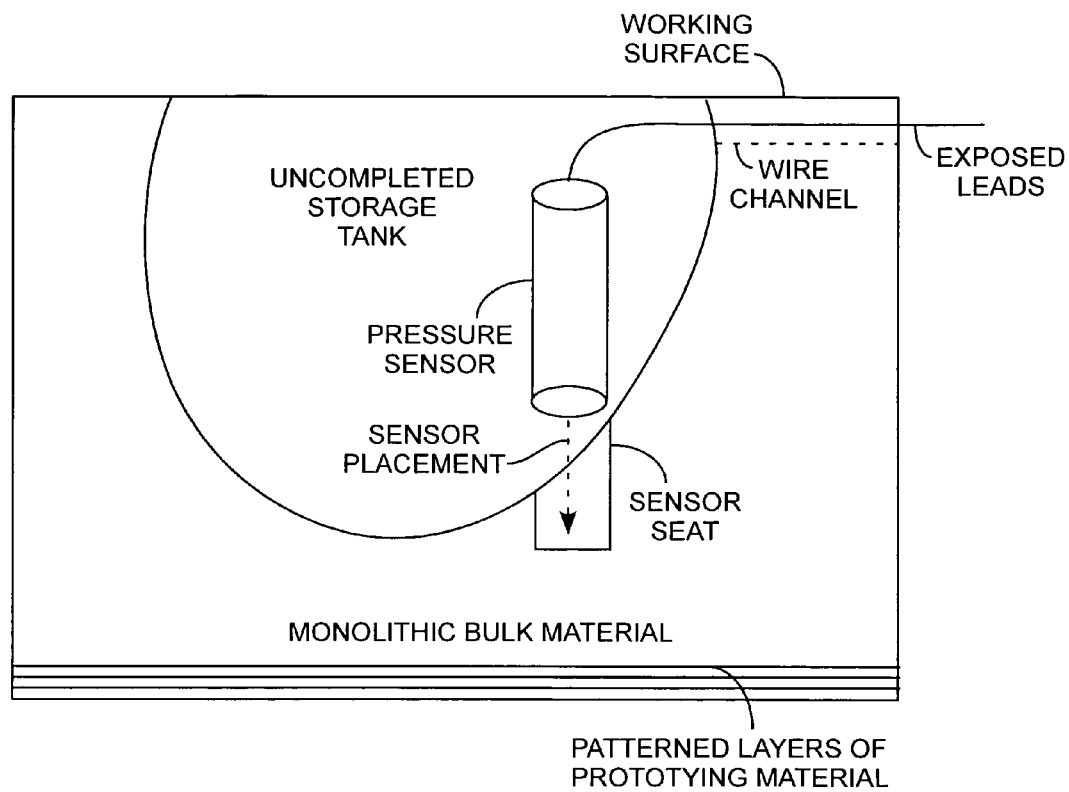
FIG. 2 depicts a partially completed monolithic bulk material device.

An embodiment of the invention is described with reference to the figures using reference designations as shown in the figures. Referring to FIGS. 1 and 2, a CAD computer model is used for creating monolithic bulk material out of patterned layers of a rapid prototyping material. A solid monolithic device is formed with included fluidic devices for fluid transport, storage, and manipulation.

The solid monolithic device can include internal fluidic devices, surface fluidic devices, internal operational devices, surface operational devices, internal device seats, and surface device seats. The internal fluidic devices may include serpentine tubes, heat exchanging tubes, mixing cavities, plenums, storage tanks, and other voids, gaps and cavities, within the monolithic bulk material for containing, storing, and passing pressurized fluids and gases. The surface fluidic devices may further include external surface interface features, such as, holes, cones, and nozzles for passing fluids and gasses to mating external devices such as mechanical heaters and valves. The surface fluidic devices may include, for example, external paths for communicating, passing, and releasing of fluids and gases. The surface fluidic devices can be nozzles, holes, or cones disposed on an exterior surface of the solid monolithic device. The solid monolithic device may include surface device seats such as threaded screw holes and dowel pin holes made of cavities for securing the surface operational devices to the monolithic devices. The surface operational devices can be interfaces and connectors for interconnecting internal fluidic devices and internal operational devices to external devices.

The internal operational devices may be encapsulated in the solid monolithic device. The internal operational devices may include electronic devices such as transmitters and receivers, optical devices such as polarizers, electromagnetic devices such as antennas, acoustical devices such as vibration meters, detectors such as gas detectors, sensors such as pressure sensors, mechanical fluidic devices such as integral filters, electromechanical devices such as valves, electrochemical devices such as chemical detectors on electrical circuit boards, all of which internal operational devices are inserted into and become part of the monolithic device.

The surface operational devices may include connectors, exposed wire leads, waveguides, optical filters, optical mirrors, optical lenses, acoustical pipes, connectors, and interfaces for interfacing the internal operational devices with external components, such as an external valve or heater. For example, the electronic circuit board could have electrical leads extending to a surface of the monolithic device. The electrical wires may be terminated as exposed leads for integrating the monolithic device within a complete system.

The monolithic device can further include internal device seats that are used to secure internal operational devices and include surface device seats that are used to secure the surface operational devices within or on the monolithic device, respectively. The monolithic device includes surface device seats that are used to secure the surface operational devices near the surface of the monolithic devices for external interfacing. The seats are typically internal or surface cavities including channels, grooves, pits, holes, spheres, and gaps into which operational devices can be disposed and secured.

By way of example, a monolithic device is made by depositing successive layers of a rapid prototyping material, which does not create gaps or voids between the layers for limiting leaks of contained fluids and gases. The prototyping materials may include resins, polymers, and metals. Depending on the material used, each layer may require a curing step, such as when using a resin. In the case of a metal, deposited hot, a cooling time to cure the molten metal may be required. The curing or cooling time is for fusing the successive layers permanently together without voids or gaps between the fused successive layers.

A partially completed monolithic bulk material device is made by depositing successive patterned layers of a rapid prototyping material such as resin. As the layers are deposited, the monolithic device becomes a homogenous bulk material device having a monolithic structure with the successive patterned layers being fused together. The patterning of the layers enables the formation for the tanks, tubes, voids, plenum, and nozzles, among many other shaped internal and surface cavities. The process of depositing successive patterned layers may be stopped for the insertion of encapsulated internal operational devices or for placing a surface operational device on the outer surface of the monolithic device. The process of making the monolithic device can be suspended between the deposition of two successive layers for inserting operational devices. The monolithic device can have an exposed cavity such as a storage tank having therein a sensor seat. The exposed cavity can have one or more internal curvilinear surface. A sensor can be disposed in this device seat for securing the sensor within the monolithic device. Likewise, an electronic circuit board can also be disposed on and in the monolithic device for encapsulating the electronic circuit board therein. Similarly, wires extending from the electronic circuit board, such as wire leads, can be disposed in a wire seating channel for routing the wires to a surface of the monolithic device for external connections. In this manner, seats can be made by patterning the layers in the monolithic devices with the layering process suspended at a current working layer, so that operational devices can be seated in the seats after which the layering process is continued until completion of the monolithic device.

The monolithic device can be an integrated fluid transport and storage module that may include various types of internal and surface fluidic devices and internal and surface operational devices as well as internal and surface seats for internally and superficially securing the internal and surface operational devices within or on the surface of the monolithic device. The monolithic device encapsulates internal fluidic and operational devices and supports surface operational devices so as to provide an integrated system, such as a spacecraft fluid and gas transport and storage subsystem.

Finite element analysis can be used to simulate the performance of the monolithic structure under the anticipated fluidic pressures. The design and analysis cycle can be iterated to optimize strength requirements while minimizing weight and size, as may be required. The final design can be exported to a rapid prototyping machine that builds successive patterned layers of material upon each other. Because the rapid prototyping material is fused between the layers in a seamless manner, no leaks between the layers or plumbing elements can occur. A fluid transport and storage system can be applied for use of propulsion in Cubesatellites and Picosatellites. The fluid transport storage system enables rapid manufacture of small size and cost effective propulsion and fluidic subsystems.

The rapid prototyping material must be one that can be laid down in successive liquid layers that are separately cured, with low brittleness and forms smooth surfaces. An example of such a material is WaterShed 11120, sold under that tradename and made by DSM Somos Company. This material belongs to a family of stereolithography apparatus process materials that do not include fillers. There are other materials that also do not include filler. Those materials with filler may not provide sufficient fusing and smoothness to prevent leaks, and are thus not preferred materials. In general, fillers in the rapid prototyping material can clog up internal plumbing. Seamless and leakless layers are preferably achieved by using various stereolithography apparatus process materials that do not contain fillers.

The present invention is directed to a fluid storage and transport module, device, or structure. The device includes internal complex plumbing features such as fluid reservoirs, filters, heat exchangers, three-dimensionally routed tubing, mixing chambers, or exit apertures formed inside or on a surface of a monolithic common bulk material. The plumbing features are joined together by fusing successive layers together in a manner for preventing leaks between the layers without the need for bonds, welds, adhesives, or compression fittings. In spacecraft monolithic devices, complex systems can be created by encapsulated operational devices, such as an inertial navigation system using internal accelerometers, reaction wheels, and cameras along with propulsion gases, as a complete spacecraft system. Those skilled in the art can make enhancements, improvements, and modifications to the invention, and these enhancements, improvements, and modifications may nonetheless fall within the spirit and scope of the following claims.

What is claimed is:

1. An apparatus for containing fluids and gases comprising:
   a spacecraft propulsion system in the form of a solid monolithic device comprising:
   a plurality of patterned layers of a rapid prototyping material comprising:
   a first patterned layer of the material;
   one or more additional patterned layers of the material,
   wherein each additional patterned layer of the material is deposited on and attached to a previously deposited patterned layer of the material and cured, and
   wherein each cured patterned layer of the material forms a seamless interface without the use of bonds, welds, or adhesives, the seamless interface having no seam between the additional patterned layer of the material and the previously deposited patterned layer of the material, wherein each patterned layer is made from the same material;
   one or more cavities disposed within the monolithic device as a result of patterning associated with one or more of the plurality of patterned layers; and
   wherein at least one of the cavities comprises a storage tank encapsulated within the monolithic device.

2. The module apparatus of claim 1, wherein each patterned layer of the material is cured to the previously deposited patterned layer of the material prior to deposition of a successive patterned layer.

3. The apparatus of claim 1, wherein the monolithic device further comprises:
   one or more internal operational devices encapsulated within the monolithic device, the internal operational devices selected from the group consisting of: an electronic transmitter, an electronic receiver, a pressure sensor, a filter, and an antenna.

4. The apparatus of claim 3, wherein the one or more internal operational devices are disposed in the one or more cavities defined within the monolithic device.

5. The apparatus of claim 4, wherein each internal operational device is disposed in a respective corresponding cavity of the one or more cavities, and wherein each of the one or more cavities is bounded by one or more internal curvilinear surfaces of one or more of the plurality of patterned layers such that each internal operational device is seamlessly encapsulated, to provide no seams between the plurality of patterned layers, within the respective corresponding cavity.

6. The apparatus of claim 1, wherein the monolithic device further comprises
   one or more internal operational devices encapsulated within the monolithic device, the one or more internal operational devices comprising at least one of an optical device.

7. The apparatus of claim 1, further comprising:
   one or more internal fluidic devices encapsulated within the monolithic device; and
   one or more surface fluidic devices disposed at least in part on an exterior surface of the monolithic device, wherein at least one of the surface fluidic devices is in fluid communication with at least one of the internal fluidic devices and in fluid communication with at least one device disposed externally to the monolithic device.

8. The apparatus of claim 7, wherein the storage tank is a pressurized storage tank, wherein the one or more surface fluidic devices comprise a diverging nozzle, and wherein the diverging nozzle is in fluid communication with the pressurized storage tank.

9. The apparatus of claim 7, wherein the one or more surface fluidic devices comprise a diverging nozzle disposed along an outer surface of the monolithic device and a valve disposed along the outer surface of the monolithic device, wherein the diverging nozzle is in fluid communication with the valve.

10. The apparatus of claim 1, wherein the module further comprises:
    one or more surface operational devices, wherein each surface operational device provides a connection or an interface between at least one device disposed externally to the monolithic device and at least one of the internal operational devices.

11. The apparatus of claim 10, wherein the one or more surface operational devices comprise at least one of: a waveguide, an optical filter, an optical minor, an optical lens, or an acoustical pipe.

12. The apparatus of claim 1, wherein the one or more cavities further comprise an electrical circuit board disposed within at least one of the one or more cavities and encapsulated by one or more of the plurality of patterned layers within the monolithic device; and
    a wire lead having a first end and a distal second end, the first end electrically coupled to the electrical circuit board and the second comprising an exposed wire lead extending out from an outer surface of the monolithic device.

13. The apparatus of claim 1, wherein the monolithic device further comprises an antenna encapsulated within the monolithic device.

14. The apparatus of claim 1, wherein the rapid prototyping material comprises a rapid prototyping stereolithography resin comprising no fillers.

15. The apparatus of claim 1, wherein the storage tank a pressurized storage tank and wherein the pressurized storage tank is configured to store one of a fluid or a gas.

16. The apparatus of claim 1, wherein the monolithic device further comprises one or more internal fluidic devices encapsulated within the monolithic device, the one or more internal fluidic devices comprising a plenum.

17. The apparatus of claim 1, wherein the monolithic device further comprises one or more internal operational devices encapsulated within the monolithic device, the one or more internal operational devices comprising an electromagnetic device.

18. The apparatus of claim 1, wherein the monolithic device further comprises one or more internal operational devices encapsulated within the monolithic device, the one or more internal operational devices comprising an electronic transmitter.

19. The apparatus of claim 1, wherein the monolithic device further comprises one or more internal operational devices encapsulated within the monolithic device, the one or more internal operational devices comprising a pressure sensor.

20. The apparatus of claim 1, wherein the monolithic device further comprises one or more internal fluidic devices encapsulated within the monolithic device, the one or more internal fluidic devices comprising a tube.

* * * * *